US012614913B2

(12) United States Patent
Lee et al.

(10) Patent No.: US 12,614,913 B2
(45) Date of Patent: Apr. 28, 2026

(54) APPARATUS AND METHOD FOR CONTROLLING BALANCE OF BATTERY

(71) Applicant: SAMSUNG SDI CO., LTD., Yongin-si (KR)

(72) Inventors: Jong Hun Lee, Suwon-si (KR); Woo Choul Kim, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 48 days.

(21) Appl. No.: 18/604,861

(22) Filed: Mar. 14, 2024

(65) Prior Publication Data

US 2025/0088013 A1 Mar. 13, 2025

(30) Foreign Application Priority Data

Sep. 8, 2023 (KR) ........................ 10-2023-0119481

(51) Int. Cl.
*H02J 7/00* (2006.01)

(52) U.S. Cl.
CPC ........ *H02J 7/0016* (2013.01); *H02J 7/00032* (2020.01); *H02J 7/0047* (2013.01); *H02J 7/00714* (2020.01)

(58) Field of Classification Search
CPC .. H02J 7/0016; H02J 7/00032; H02J 7/00714; H02J 7/0047
USPC .......................... 713/340; 320/118, 134, 137
See application file for complete search history.

(56) References Cited

U.S. PATENT DOCUMENTS

| | | | | | |
|---|---|---|---|---|---|
| 8,704,488 | B2 * | 4/2014 | Yun | .................. | H02J 7/0048 |
| | | | | | 320/124 |
| 11,411,255 | B2 * | 8/2022 | Kim | .................. | H02J 7/0019 |
| 11,495,976 | B2 * | 11/2022 | Eo | .................. | G01R 31/3835 |
| 2012/0086399 | A1 | 4/2012 | Choi | | |
| 2019/0207406 | A1 * | 7/2019 | Matthey | .............. | H02J 7/00309 |
| 2020/0203780 | A1 * | 6/2020 | Mandli | .............. | H02J 7/00712 |
| 2020/0280108 | A1 * | 9/2020 | Tomar | ................ | H01M 10/482 |

FOREIGN PATENT DOCUMENTS

| | | |
|---|---|---|
| EP | 2685591 B1 | 11/2017 |
| EP | 3605779 A1 | 2/2020 |
| KR | 10-1182431 B1 | 9/2012 |
| KR | 10-2021-0050396 A | 5/2021 |
| KR | 10-2022-0060997 A | 5/2022 |

OTHER PUBLICATIONS

Extended European Search Report issued on Oct. 7, 2024, in the corresponding European Patent Application No. 24164515.9.

* cited by examiner

*Primary Examiner* — Brian T Misiura
(74) *Attorney, Agent, or Firm* — Lee IP Law, P.C.

(57) ABSTRACT

An apparatus for controlling balance of a battery includes a battery including multiple battery cells, a sensor measuring voltages of the multiple battery cells and a processor monitoring states of the multiple battery cells to detect failure of the multiple battery cells based on data obtained through the sensor, setting a defective battery cell as an exclusion cell and performing an imbalance determination and balancing operation with respect to the multiple battery cells excluding the battery cell set as the exclusion cell.

18 Claims, 6 Drawing Sheets

APPARATUS AND METHOD FOR CONTROLLING BALANCE OF BATTERY

CROSS-REFERENCE TO RELATED APPLICATION

The present application claims the benefit of Korean Patent Application No. 10-2023-0119481, filed on Sep. 8, 2023 in the Korean Intellectual Property Office, the entire disclosure of which is incorporated herein by reference.

BACKGROUND

1. Field

Embodiments relate to an apparatus and method for controlling balance of a battery, which performs cell balancing for remaining battery cells excluding a defective battery cell and controls charge/discharge current based on a state-of-health of the battery cells.

2. Description of the Related Art

In recent years, the use of batteries has expanded not only to mobile devices, such as cellular phones, tablet computers, and the like, but also to electric vehicles (EVs, HEVs, PHEVs, and the like) and large energy storage systems (ESS).

Energy storage systems (ESS) are connected to power generation facilities to store generated energy and discharge the energy as needed to supply the energy to a load or a power system.

Batteries are often configured to have multiple battery cells in a single battery pack to store large quantities of energy.

Due to characteristics of a battery as a product including chemical materials, a voltage deviation can occur between battery cells in the battery. Such deviation in the battery is not likely to be detected immediately after production thereof and can occur during charge or discharge multiple times after actual use.

A voltage deviation in a battery can cause not only abnormality in a single battery cell, but also reduction in use capacity of other battery cells.

However, even if a defective battery cell is present in a battery, it is not possible to determine whether the battery cell needs to be replaced in an early stage of use of the battery and thus the abnormal battery may unknowingly be used.

If the defective battery cell is used together with a normal battery cell, voltage imbalance may occur and cell balancing may be repeatedly performed due to the voltage imbalance.

Moreover, frequent cell balancing can cause limited use of batteries in a product.

Therefore, classification and inspection of a defective battery cell, even in an initial stage of use of a battery, is desirable.

SUMMARY

Embodiments include an apparatus for controlling balance of a battery. The apparatus may include a battery including multiple battery cells, a sensor measuring voltages of the multiple battery cells and a processor monitoring states of the multiple battery cells to detect failure of the multiple battery cells based on data obtained through the sensor, setting a defective battery cell as an exclusion cell and performing an imbalance determination and balancing operation with respect to the multiple battery cells excluding the battery cell set as the exclusion cell.

The processor may generate an alarm requesting inspection for the battery cell set as the exclusion cell and may output the alarm through an output unit.

The processor may release the exclusion setting and the alarm if inspection for the battery cell set as the exclusion cell is performed or the battery cell set as the exclusion cell is replaced.

The processor may monitor a voltage of the battery cell set as the exclusion cell.

The processor may detect a battery cell having a lowest voltage among remaining battery cells excluding the battery cell set as the exclusion cell among the multiple battery cells and may perform an imbalance determination as to the battery cells with reference to the battery cell having a lowest voltage among the remaining battery cells.

The processor may perform a balancing operation with respect to remaining battery cells excluding the battery cell set as the exclusion cell among the multiple battery cells with reference to a voltage of a battery cell having a lowest voltage among the remaining battery cells.

The processor may calculate a charge current limit (CCL) and a discharge current limit (DCL) of the battery by reflecting a state-of-health (SOH) of the multiple battery cells.

The processor may generate guides for a charge current and a discharge current including the charge current limit (CCL) and the discharge current limit (DCL) and may transmit the guides to a preregistered terminal through a communication unit.

The processor may control a charge current of the battery corresponding to the charge current limit (CCL) and may control an output of the battery corresponding to the discharge current limit (DCL).

Embodiments include a method for controlling balance of a battery. The method includes monitoring, by a processor, states of the multiple battery cells to detect a failure of the multiple battery cells based on voltages of the multiple battery cells measured through a sensor, setting, by the processor, a defective battery cell as an exclusion cell, performing, by the processor, an imbalance determination as to the multiple battery cells excluding the battery cell set as the exclusion cell and performing, by the processor, a balancing operation with respect to the multiple battery cells excluding the battery cell set as the exclusion cell if the multiple battery cells are in an imbalanced state.

Setting a defective battery cell as an exclusion cell may include generating an alarm requesting inspection for the battery cell set as the exclusion cell, followed by outputting the alarm through an output unit.

Setting a defective battery cell as an exclusion cell may include monitoring a voltage of the battery cell set as the exclusion cell.

The method for controlling balance of a battery may further include releasing, by the processor, after setting the defective battery cell as the exclusion cell, the exclusion setting and the alarm, if inspection for the battery cell set as the exclusion cell is performed or the battery cell set as the exclusion cell is replaced.

Performing an imbalance determination may include detecting a battery cell having a lowest voltage among remaining battery cells excluding the battery cell set as the exclusion cell among the multiple battery cells and performing an imbalance determination with reference to the battery cell having the lowest voltage among the remaining battery cells.

In performing the imbalance determination, if a first battery cell included in the exclusion cell among the multiple battery cells has the lowest voltage, the processor may perform the imbalance determination as to the multiple battery cells excluding the first battery cell by comparing a voltage of a second battery cell having a next lowest voltage with a preset value.

Performing the balancing operation may include performing the balancing operation for voltage with respect to remaining battery cells excluding the battery cell set as the exclusion cell among the multiple battery cells.

Performing the balancing operation may include performing the balancing operation with respect to the remaining battery cells with reference to a voltage of a battery cell having a lowest voltage among the remaining battery cells.

The method for controlling balance of a battery may further include calculating, by the processor, a state-of-health (SOH) of the multiple battery cells, calculating, by the processor, a charge current limit (CCL) and a discharge current limit (DCL) of the battery by reflecting the state-of-health (SOH) and generating, by the processor, guides for a charge current and a discharge current including the charge current limit (CCL) and the discharge current limit (DCL).

The method for controlling balance of a battery may further include outputting, by the processor, the guides through an output unit or transmitting, by the processor, the guides to a preregistered terminal through a communication unit.

The method for controlling balance of a battery may further include controlling, by the processor, a charge current applied corresponding to the charge current limit (CCL) to charge the battery and controlling, by the processor, an output of the battery corresponding to the discharge current limit (DCL) to supply the output to a load.

BRIEF DESCRIPTION OF DRAWINGS

Features will become apparent to those of skill in the art by describing in detail exemplary embodiments with reference to the attached drawings in which.

DETAILED DESCRIPTION

Figure 1:
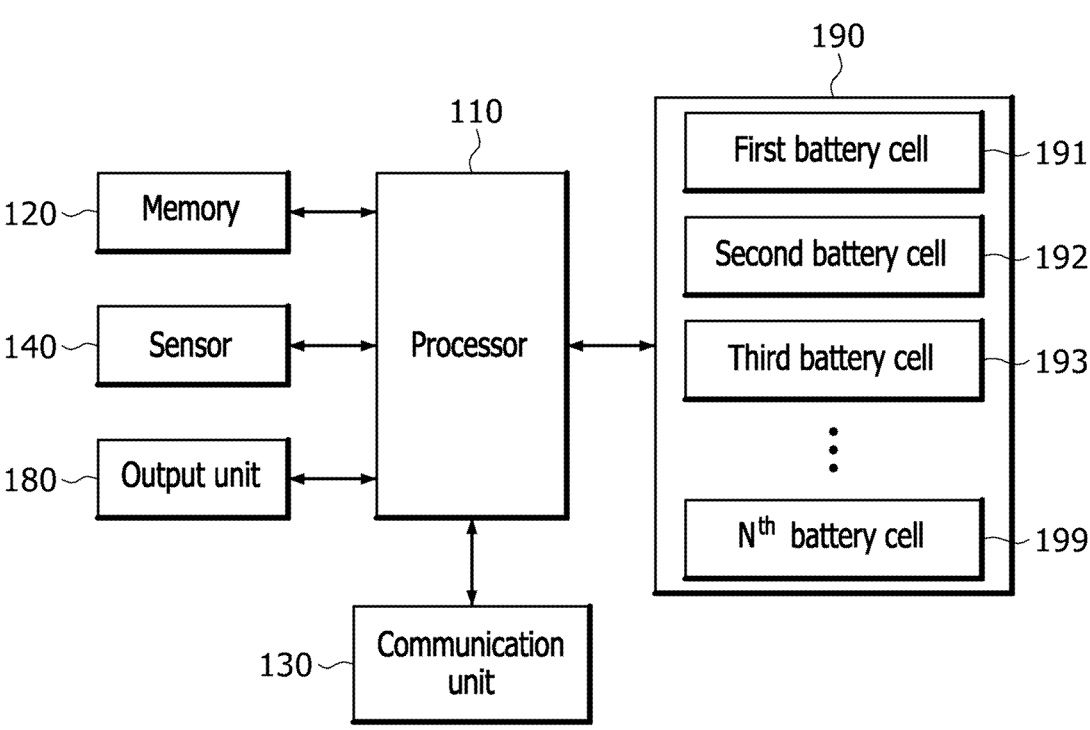
FIG. 1 is a block diagram of an apparatus for controlling balance of a battery according to one or more embodiments.

In the drawing figures, the dimensions of layers and regions may be exaggerated for clarity of illustration. It will also be understood that if a layer or element is referred to as being "on" another layer or substrate, it can be directly on the other layer or substrate, or intervening layers may also be present. Further, it will be understood that if a layer is referred to as being "under" another layer, it can be directly under, and one or more intervening layers may also be present. In addition, it will also be understood that if a layer is referred to as being "between" two layers, it can be the only layer between the two layers, or one or more intervening layers may also be present. Like reference numerals refer to like elements throughout.

The terms or words used in this specification and claims should not be construed as being limited to the usual or dictionary meaning and should be interpreted as meaning and concept consistent with the technical idea of the present disclosure based on the principle that the inventor can be his/her own lexicographer to appropriately define the concept of the term to explain in his/her best way.

It will be understood that if an element or layer is referred to as being "on," "connected to," or "coupled to" another element or layer, it may be directly on, connected, or coupled to the other element or layer or one or more intervening elements or layers may also be present. If an element or layer is referred to as being "directly on," "directly connected to," or "directly coupled to" another element or layer, there are no intervening elements or layers present. For example, if a first element is described as being "coupled" or "connected" to a second element, the first element may be directly coupled or connected to the second element or the first element may be indirectly coupled or connected to the second element via one or more intervening elements.

As used herein, the term "and/or" includes any and all combinations of one or more of the associated listed items. Further, the use of "may" when describing embodiments of the present disclosure relates to "one or more embodiments of the present disclosure." Expressions, such as "at least one of" and "any one of," when preceding a list of elements, modify the entire list of elements and do not modify the individual elements of the list. If phrases such as "at least one of A, B and C, "at least one of A, B or C," "at least one selected from a group of A, B and C," or "at least one selected from among A, B and C" are used to designate a list of elements A, B and C, the phrase may refer to any and all suitable combinations or a subset of A, B and C, such as A, B, C, A and B, A and C, B and C, or A and B and C. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing embodiments of the present disclosure and is not intended to be limiting of the present disclosure. As used herein, the singular forms "a" and "an" are intended to include the plural forms as well, unless the context clearly indicates otherwise. It will be further understood that the terms "includes," "including," "comprises," and/or "comprising," if used in this specification, specify the presence of stated features, integers, steps, operations, elements, and/or components but do not preclude the presence or addition of one or more other features, integers, steps, operations, elements, components, and/or groups thereof.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

References to two compared elements, features, etc. as being "the same" may mean that they are "substantially the same". Thus, the phrase "substantially the same" may include a case having a deviation that is considered low in the art, for example, a deviation of 5% or less. In addition, where a certain parameter is referred to as being uniform in a given region, it may mean that it is uniform in terms of an average.

Throughout the specification, unless otherwise stated, each element may be singular or plural.

If an arbitrary element is referred to as being disposed (or located or positioned) on the "above (or below)" or "on (or under)" a component, it may mean that the arbitrary element is placed in contact with the upper (or lower) surface of the component and may also mean that another component may be interposed between the component and any arbitrary element disposed (or located or positioned) on (or under) the component.

In addition, it will be understood that where an element is referred to as being "coupled," "linked" or "connected" to another element, the elements may be directly "coupled," "linked" or "connected" to each other, or an intervening element may be present therebetween, through which the element may be "coupled," "linked" or "connected" to another element. In addition, if a part is referred to as being "electrically coupled" to another part, the part can be directly connected to another part or an intervening part may be present therebetween such that the part and another part are indirectly connected to each other.

Throughout the specification, where "A and/or B" is stated, it means A, B or A and B, unless otherwise stated. That is, "and/or" includes any or all combinations of a plurality of items enumerated. Where "C to D" is stated, it means C or more and D or less, unless otherwise specified.

Hereinafter, exemplary embodiments will be described in detail with reference to the accompanying drawings. The drawings may be exaggerated in width, length, and thickness of components for descriptive convenience and clarity only. In addition, the terminology used herein is defined by taking functions of the embodiments into account and can be changed according to the custom or intention of users or operators. Therefore, definition of the terminology should be made according to the overall disclosure set forth herein.

FIG. 1 is a block diagram of a battery balance control apparatus according to one or more embodiments.

Referring to FIG. 1, an apparatus for controlling balance of a battery (hereinafter, control apparatus) 100 may include a memory 120, a communication unit 130, a sensor 140, an output unit 180, a battery 190 and a processor 110.

The battery 190 may be charged by a charge current and may output a charged current. The battery 190 may include multiple battery cells 191 to 199. The multiple battery cells 191 to 199 may be modularized to be replaced one by one.

The sensor 140 may include at least one selected from among a voltage sensor, a current sensor and a temperature sensor.

In some embodiments, the sensor 140 may measure a voltage or current of the battery 190 to send the measured voltage or current to the processor 110. In other embodiments, the sensor 140 may measure a temperature of the battery 190 to send the measured temperature to the processor 110.

The output unit 180 may include at least one of an LED lamp, a display and a speaker. In some embodiments, the output of output unit 180 may be provided to a product including the controlling apparatus 100.

The output unit 180 may output an alarm in response to a control instruction from the processor 110.

The output unit 180 may output data on the temperature, current and voltage of the battery 190. The output unit 180 may output information on a defective battery cell among the multiple battery cells 191 to 199 of the battery 190.

The output unit 180 may output a request for inspection of the defective battery cell through the alarm. Corresponding to the alarm, the output unit 180 may output a warning sound through a speaker or warning light through a lamp and/or may output a warning message through a display.

If the alarm is released by the processor 110, the output unit 180 may stop outputting the warning sound, turn off the warning light and/or delete the warning message.

The memory 120 may store data measured by the sensor 140, data for controlling the battery, data for controlling one or more switches, reference data for imbalance determination and/or data for cell balancing. In addition, the memory 120 may store data calculated by the processor 110.

The memory 120 may store capacity of the multiple battery cells, data on the voltage, current and temperature of each of the battery cells, state-of-charge (SOC) data, and state-of-health (SOH) data.

The memory 120 may include a non-volatile memory, such as a random access memory (RAM), a random access memory (ROM), an electrically erased programmable ROM (EEPROM), a flash memory, storage devices, such as an SDD and an SSD, and the like.

The communication unit 130 may transmit and receive data between an external controller (not shown) and the processor 110. In some embodiments, the communication unit 130 may include a driver for CAN (Controller Area Network) communication or a driver for LIN (Local Interconnect Network) communication to transmit and receive the data. The communication unit 130 may transmit and receive the data through serial communication or parallel communication.

In some embodiments, the communication unit 130 may communicate with a user or administrator terminal through a wired, wireless or electronic communication module. For example, the communication unit 130 may communicate using a communication method, such as Ethernet, Wi-Fi, Bluetooth, and the like.

The processor 110 may monitor and manage a state of the battery 190. The processor 110 may include any one of a central processing unit (CPU), an electronic control unit (ECU), a microcontroller unit (MCU) and a battery management system (BMS).

In some embodiments, the processor may be implemented (as an entity diagnosing the battery system (BAT)) by a central processing unit (CPU) or a system-on-chip (SoC), may execute an operating system or application to control multiple hardware or software components connected to the processor and may perform various data processing and calculation. The processor may be configured to execute at least one instruction stored in the memory and store data resulting from the execution in the memory.

The processor 110 may determine the state of the battery 190 and may detect failure of the battery based on at least one of the current, voltage and temperature of the battery measured via the sensor 140.

The processor 110 may calculate the state-of-charge (SOC) of the battery 190. The processor 110 may calculate the state-of-health (SOH) of the battery 190.

The processor 110 may perform balancing with respect to the multiple battery cells by monitoring the voltage of each of the battery cells and determining imbalance based on a voltage difference between the battery cells.

The processor 110 may control charge and discharge of the battery 190 and may detect a defective battery cell by monitoring the voltage of each of the battery cells.

The processor 110 may set the defective battery cell as an exclusion cell.

The processor 110 may generate an alarm requesting inspection with respect to the defective battery cell and may output the alarm through the output unit 180.

The processor 110 may exclude any defective battery cell, which is set as the exclusion cell, from the balancing operation. That is, the processor 110 may disregard imbalance caused by a defective battery cell determined to be abnormal and may determine whether remaining battery cells are in an imbalanced state.

The processor 110 may release the alarm if the defective battery cell is replaced. The processor 110 may release the corresponding battery cell from the exclusion cell.

In addition, the processor 110 may calculate a charge current limit (CCL) and a discharge current limit (DCL) based on the state-of-health (SOH) of the battery 190.

The processor 110 may generate a charge current guide or a discharge current guide including at least one of the charge current limit (CCL) and the discharge current limit (DCL).

In addition, the processor 110 may control a charge current and a discharge current with respect to the battery 190 corresponding to the charge current limit (CCL) and the discharge current limit (DCL).

The processor 110 may output the charge current guide and the discharge current guide through the output unit 180 or may transmit the charge current guide and the discharge current guide to a user or manager terminal through the communication unit 130.

A user or a manager may charge the battery 190 by setting the charge current so as not to exceed the charge current limit (CCL) according to the charge current guide upon charging the battery 190.

In addition, the user or the manager may control the discharge current so as not to exceed the discharge current limit (DCL) according to the discharge current guide upon outputting electric current through discharge of the battery 190.

Figure 2:
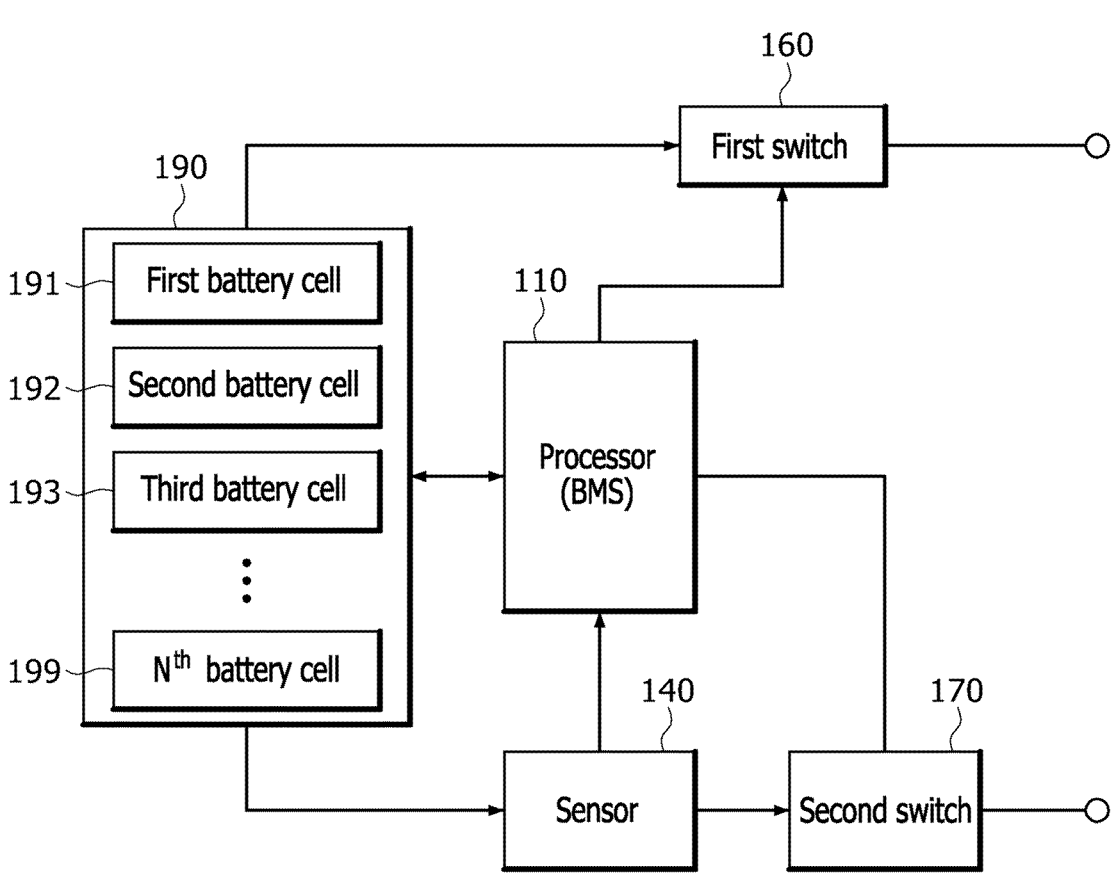
FIG. 2 is an exemplary diagram of a battery connection configuration of the battery balance control apparatus according to one or more embodiments.

FIG. 2 is an exemplary diagram of a battery connection configuration of the battery balance control apparatus according to one or more embodiments.

Referring to FIG. 2, the battery 190 may be connected at one end thereof to a first switch 160 and at the other end thereof to the sensor 140 and a second switch 170.

The sensor 140 may include multiple sensors. The sensor 140 may include at least one of a voltage sensor, a current sensor and a temperature sensor and may send data of the battery 190 measured thereby to the processor 110.

The sensor 140 may measure a voltage of the battery 190 and individual voltages of the multiple battery cells 191 to 199.

The first switch 160 and the second switch 170 may output or block a discharge current of the battery 190. In addition, the first switch 160 and the second switch 170 may supply an external charge current to the battery 190 or block the external charge current.

The first switch 160 and the second switch 170 may be switched on or off according to a control signal of the processor 110. The processor 110 may charge the battery 190 or may allow the battery 190 to output a discharge current by controlling the first switch 160 and the second switch 170.

The processor 110 may determine the state of the battery 190 based on data supplied from the sensor 140. In addition, the processor 110 may determine failure of the battery 190 based on the data.

The processor 110 may measure voltage and current of each of the multiple battery cells 191 to 199 of the battery 190 through the sensor 140.

In various embodiments, the processor 110 may compare voltages of the battery cells and may determine that a certain battery cell is in an imbalanced state if the corresponding battery cell has a higher or lower voltage than other battery cells by a preset value or more.

If the voltage of the battery cell is in an imbalanced state, the processor 110 may perform a balancing operation with respect to the multiple battery cells 191 to 199.

In embodiments, upon initial operation of the battery 190, the processor 110 may perform charge and discharge with respect to the battery 190 and may perform a balancing operation with respect to a voltage deviation between the battery cells.

The processor 110 may determine that a certain battery cell is a defective battery cell with abnormality in at least one of the following cases: where the voltage deviation of the corresponding battery cell is greater than or equal to a predetermined value even after a balancing operation is performed a predetermined number of times or more; where the state-of-charge change rate of the corresponding battery cell is less than or equal to a predetermined value during charge of the battery; and where the discharge rate of the corresponding battery cell is faster than the discharge rate of other battery cells.

In an example embodiment, if the voltage of the first battery cell 191 is higher or lower than the voltages of the other battery cells by a predetermined value or more, or if the state-of-charge thereof is not changed, the processor 110 may determine the first battery cell 191 as a defective battery cell.

The processor 110 may set the defective battery cell as an exclusion cell. For the first battery cell 191 set as the exclusion cell, the processor 110 may generate an alarm and output the alarm through the output unit 180. The processor 110 may maintain the alarm until the first battery cell 191 is inspected or replaced.

The processor 110 may continuously monitor the voltage, current and temperature of the defective battery cell set as the exclusion cell.

The processor 110 excludes the defective battery cell set as the exclusion cell from imbalance determination targets. In addition, the processor 110 may exclude the defective battery cell set as the exclusion cell in a balancing operation.

Further, the processor 110 may exclude the defective battery cell set as the exclusion cell in calculation of SOC and SOH.

For the remaining battery cells 192 to 199 including the second to $n^{th}$ battery cells excluding the first battery cell 191 set as the defective battery cell, the processor 110 may perform an imbalance determination by, in some embodiments, comparing the voltage of a battery cell having the lowest voltage among the remaining battery cells with a predetermined imbalance condition (preset value).

In other embodiments, the processor 110 may perform an imbalance determination depending upon a voltage difference between the battery cells.

Upon determining that the battery cells are in an imbalanced state, the processor 110 may perform a balancing operation after checking a condition for performing the balance operation.

In embodiments, the processor 110 may perform a balancing operation with respect to the second to $n^{th}$ battery cells 192 to 199, if a lowest voltage among the voltages of the remaining battery cells 192 to 199 excluding the first battery cell 191 satisfies the condition for performing the balancing operation.

The processor 110 may perform a balancing operation with respect to the second to $n^{th}$ battery cell 192 to 199 excluding the first battery cell 191 set as the exclusion cell with reference to the lowest voltage among the voltages of the second to $n^{th}$ battery cells 192 to 199.

In an example embodiment, assuming that the first battery cell 191 has a voltage of 3.0V, the second battery cell 192 has a voltage of 3.2 V, and a third battery cell 193 has a voltage of 3.75 V, the processor 110 may set the first battery cell 191 as the exclusion cell and may output an alarm for the first battery cell 191 if the first battery cell 191 is a defective battery cell.

The processor 110 may compare the voltage of the second battery cell 192, that is, 3.2 V, which is the lowest voltage among the voltages of the second battery cell 192 and the third battery cell 193, with a first preset value corresponding to the predetermined imbalance condition. For example, the preset value may be set to 3.1 V.

Although an actual lowest voltage among the measured voltages of the battery cells is the voltage of the first battery cell 191, the first battery cell is the exclusion cell and thus the processor 110 may exclude the first battery cell 191 upon an imbalance determination.

Accordingly, the processor 110 may compare the voltage of the second battery cell 192, that is, 3.2 V, which is the lowest voltage among the voltages of the remaining battery cells excluding the first battery cell 191, with 3.1 V (the preset value) corresponding to the predetermined imbalance condition.

Since the voltage of the second battery cell 192, that is, 3.2 V, is greater than the first preset value of 3.1 V, the processor 110 may determine that the battery cells are in a normal state.

In another example embodiment, assuming that the first battery cell 191 has a voltage of 3.73V, the second battery cell 192 has a voltage of 3.75 V, and the third battery cell 193 has a voltage of 3.78 V, the processor 110 may set the first battery cell 191 as the exclusion cell and may perform voltage balancing with respect to the remaining battery cells from the second to $n^{th}$ battery cells 192 to 199.

In this example embodiment, the processor 110 may perform a balancing operation with reference to the voltage of the second battery cell 192, that is, 3.75 V, which is the lowest voltage among the voltages of the second to $n^{th}$ battery cells 192 to 199.

Figure 3A:
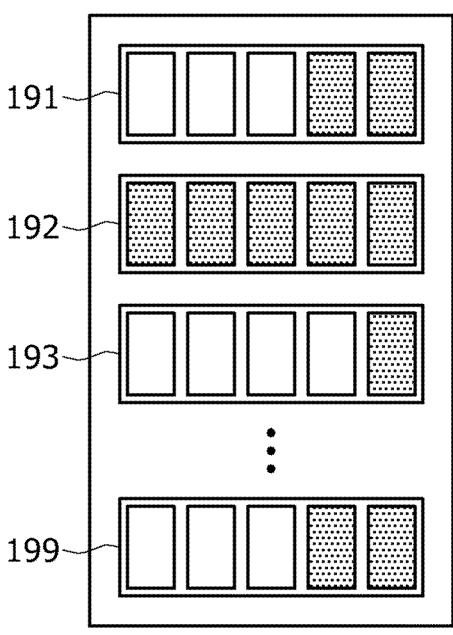
FIGS. 3A and 3B are views depicting an imbalanced state caused by a voltage deviation between battery cells according to one or more embodiments.
Figure 3B:
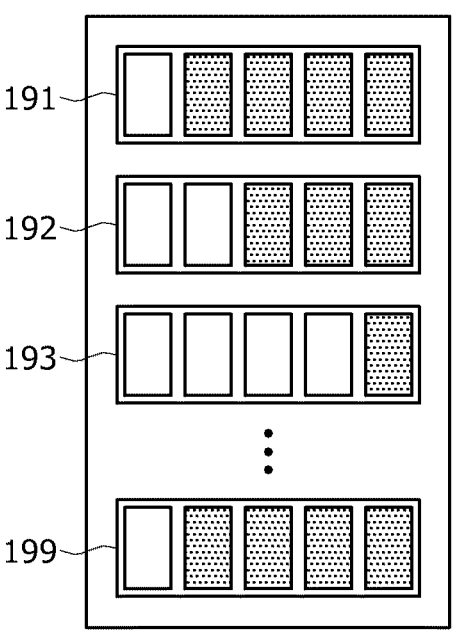

FIGS. 3A and 3B are views depicting an imbalanced state caused by a voltage deviation between battery cells according to one or more embodiments.

Referring to FIG. 3A, if the second battery cell 192 is not discharged with the first battery cell 191, the third battery cell 193 and the $n^{th}$ battery cell 199 among the multiple battery cells 191 to 199 of the battery, the processor 110 may determine that the second battery cell 192 is a defective battery cell.

The processor 110 may set the second battery cell 192 as an exclusion cell A1.

If the second battery cell 192 is set as the exclusion cell A1, the processor 110 may set the third battery cell 193 having the lowest voltage as a reference voltage B1. The processor 110 may compare the voltage of the third battery cell 193 with a preset value to determine whether the battery cells are in an imbalanced state.

Upon balancing of the battery cells, the processor 110 may perform the balancing operation with reference to the voltage of the third battery cell 193 which has the lowest voltage.

Referring to FIG. 3B, the processor 110 may determine that the third battery cell 193 is a defective battery cell if the state-of-charge of the third battery cell 193 is different from those of the other battery cells.

The processor 110 may set the third battery cell 193 as an exclusion cell A2.

If the third battery cell 193 is set as the exclusion cell A2, the processor 110 may set the second battery cell 192 having the lowest voltage as a reference voltage B2. The processor 110 may compare the voltage of the second battery cell 192 set as the reference voltage B2 with a preset value to determine whether the battery cells are in an imbalanced state.

Further, the processor 110 may perform a balancing operation with respect to the remaining battery cells excluding the third battery cell 193 with reference to the voltage of the second battery cell 192 which has the lowest voltage.

Figure 4:
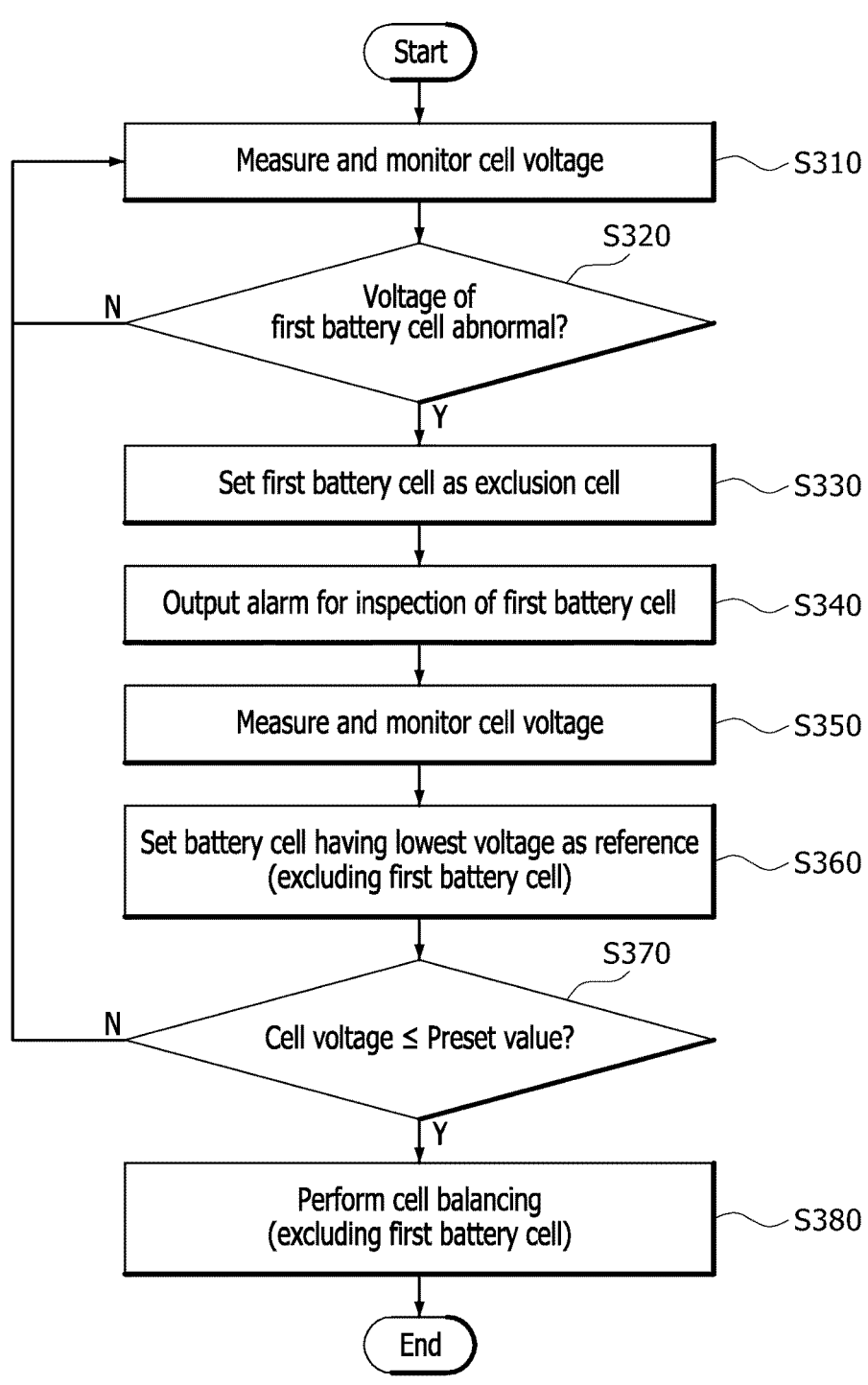
FIG. 4 is a flowchart illustrating a method for controlling balance of a battery according to one or more embodiments.

FIG. 4 is a flowchart illustrating a method for controlling balance of a battery according to one or more embodiments.

Referring to FIG. 4, the processor 110 may measure and monitor the voltages of the battery cells of the battery 190 through the sensor 140 (S310).

If a voltage difference between the first battery cell 191 and the other battery cells is greater than or equal to a preset value, the processor 110 may determine the first battery cell as a defective battery cell (S320).

The processor 110 may set the first battery cell 191, which is determined to be the defective battery cell, as an exclusion cell (S330).

The processor 110 may generate an alarm requesting inspection for the first battery cell set as the exclusion cell and may output the alarm through the output unit 180 (S340). The output unit 180 may output the inspection request alarm in the form of at least one of a warning sound, a warning light and a warning message.

The processor 110 may maintain the first battery cell 191 as the exclusion cell until the first battery cell 191 is inspected or replaced.

The processor 110 may continuously monitor voltages of the multiple battery cells 191 to 199 including the first battery cell 191 by receiving cell voltages thereof (S350).

The processor 110 may perform an imbalance determination of the voltages of the multiple battery cells 191 to 199.

The processor 110 may perform an imbalance determination as to the battery cells with reference to a battery cell having a lowest voltage among the battery cells. If the first battery cell 191 has the lowest voltage, the processor 110 may exclude the first battery cell upon an imbalance determination and may perform an imbalance determination as to the battery cells with reference to a battery cell having the next lowest voltage. For example, the processor 110 may perform an imbalance determination as to the battery cells with reference to the second battery cell having the lowest voltage among the remaining battery cells excluding the first battery cell.

The processor 110 may compare the voltage of the second battery cell with a preset value for imbalance determinations and may determine that the battery cells are in an imbalanced state if the voltage of the second battery cell is less than or equal to the preset value (S370).

In one or embodiments, the processor 110 may determine that the battery cells are in an imbalanced state if a difference between the voltage of the second battery cell having the lowest voltage and an average voltage of the battery cells is greater than or equal to a preset value or if a difference between the voltage of the second battery cell having the lowest voltage and the voltage of a battery cell having the highest voltage is greater than or equal to a preset value.

Upon determining that the battery cells are in the imbalanced state, the processor 110 may perform a balancing operation with respect to the remaining battery cells excluding the exclusion cell (S380).

Upon performing a balancing operation, the processor 110 may perform the balancing operation with reference to the voltage of the second battery cell 192 having the lowest voltage.

In embodiments, the processor 110 may solve the problem of determining an imbalance caused by a defective battery cell set as the exclusion cell. In addition, the processor 110 may exclude the defective battery cell set as the exclusion cell upon performing a balancing operation with respect to the voltages of the battery cells, thereby enabling effective balancing operation.

Upon inspection or replacement of the first battery cell 191 determined to be the defective battery cell, the processor 110 may release the alarm and exclusion setting for the first battery cell to delete the first battery cell from the exclusion cell.

Figure 5:
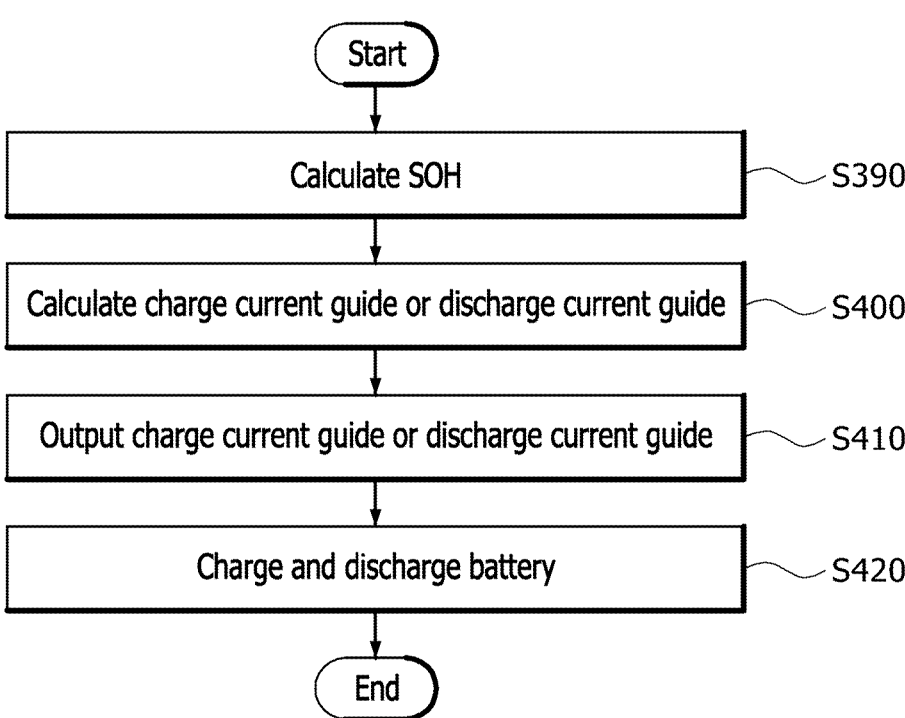
FIG. 5 is a flowchart illustrating a method for guiding a charge/discharge current depending on state-of-health by the apparatus for controlling balance of a battery according to one or more embodiments.

FIG. 5 is a flowchart illustrating a method for guiding a charge/discharge current depending on state-of-health, by the apparatus, for controlling balance of a battery according to one or more embodiments.

Referring to FIG. 5, the processor 110 may calculate a state-of-health of the battery 190 including the multiple battery cells 191 to 199 (S390).

The processor 110 may calculate the state-of-health based on at least one of charging time, accumulated current, state of charge (SOC) change rate, usage time, capacity, and resistance change per voltage interval. In addition, the processor 110 may calculate the state-of-health (SOH) using a machine learning model. The processor 110 may calculate the state-of-health (SOH) for each battery cell.

The processor 110 may calculate a charge current limit and a discharge current limit by representing the state-of-health (SOH) (S400).

The processor 110 may calculate the charge current limit (CCL) according to the following Equation 1. The processor 110 may calculate the charge current limit based on an assumed initial capacity of the battery cells. The processor 110 may calculate the charge current limit (CCL) based on a nominal voltage, design capacity, the maximum charge C-rate, a configuration constant, and an average cell voltage.

$$CCL = \frac{\text{Nominal voltage} \times \text{Design capacity} \times \text{Maximum } C\text{-rate} \times \text{Configuration constant}}{\text{Average cell voltage}} \quad \text{(Equation 1)}$$

In an example embodiment, assuming that a battery cell has a capacity of 112 Ah, the nominal voltage may be set to about 3.63 V, the design capacity may be set to about 112 V, the maximum charge C-rate may be set to 0.9, and the configuration constant may be set to 1.0. This is based on initial specifications of the battery cell and an assumption that the same type of battery cell is used.

As a result, in this example embodiment, the charge current limit (CCL) may be calculated to be about 98.89.

The processor 110 may output a guide including at least one of the charge current limit (CCL) and the discharge current limit (DCL) (charge current guide or discharge current guide) through the output unit 180 (S410).

In addition, the processor 110 may transmit the charge current guide or the discharge current guide to an external terminal through the communication unit 130.

The processor 110 may charge the battery 190 or may control a discharge current of the battery 190 according to a charge current set outside (S420).

In embodiments, a user or a manager may charge the battery 190 by setting the charge current so as not to exceed the charge current limit (CCL) according to the charge current guide upon charging the battery 190.

In addition, the user or the manager may control the discharge current so as not to exceed the discharge current limit (DCL) according to the discharge current guide upon outputting electric current through discharge of the battery 190.

Accordingly, embodiments herein may guide charging/discharging while protecting the battery 190, thereby improving use efficiency and lifespan of the battery.

One or more embodiments of the present disclosure provide an apparatus and method for controlling balance of a battery, which inspects a defective battery cell with abnormality in the battery, prevents unnecessary balancing operation by excluding the defective battery cell in the balancing operation due to imbalance by the defective battery cell and protects battery cells in the battery.

Embodiments herein provide an apparatus and method for controlling balance of a battery cell, which allows limited use of electric current upon charge or discharge in consideration of states-of-health of battery cells.

The embodiments described herein may be implemented, for example, as a method or process, a device, a software program, a data stream, or a signal. Although discussed in the context of a single type of implementation (for example, discussed only as a method), features discussed herein may also be implemented in other forms (for example, a device or a program). The device may be implemented by suitable hardware, software, firmware, and the like. The method may be implemented on a device, such as a processor that generally refers to a processing device including a computer, a microprocessor, an integrated circuit, a programmable logic device, etc. The processor includes a communication device, such as a computer, a cell phone, a personal digital assistant (PDA), and other devices that facilitate communication of information between the device and end-users.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for controlling balance of a battery, the apparatus comprising:
   a battery comprising multiple battery cells;
   a sensor measuring voltages of the multiple battery cells; and
   a processor monitoring states of the multiple battery cells to detect failure of the multiple battery cells based on data obtained through the sensor, setting a defective battery cell as an exclusion cell and performing an imbalance determination and balancing operation with respect to the multiple battery cells excluding the battery cell set as the exclusion cell, wherein the processor detects a battery cell having a lowest voltage among remaining battery cells excluding the battery cell set as the exclusion cell among the multiple battery cells and performs an imbalance determination as to the battery cells with reference to the battery cell having the lowest voltage among the remaining battery cells.

2. The apparatus for controlling balance of a battery as claimed in claim 1, wherein the processor generates an alarm requesting inspection for the battery cell set as the exclusion cell and outputs the alarm through an output unit.

3. The apparatus for controlling balance of a battery as claimed in claim 2, wherein the processor releases the exclusion setting and the alarm if inspection for the battery cell set as the exclusion cell is performed or the battery cell set as the exclusion cell is replaced.

4. The apparatus for controlling balance of a battery as claimed in claim 1, wherein the processor monitors a voltage of the battery cell set as the exclusion cell.

5. The apparatus for controlling balance of a battery as claimed in claim 1, wherein the processor performs a balancing operation with respect to remaining battery cells excluding the battery cell set as the exclusion cell among the multiple battery cells with reference to a voltage of a battery cell having a lowest voltage among the remaining battery cells.

6. The apparatus for controlling balance of a battery as claimed in claim 1, wherein the processor calculates a charge current limit (CCL) and a discharge current limit (DCL) of the battery by reflecting a state-of-health (SOH) of the multiple battery cells.

7. The apparatus for controlling balance of a battery as claimed in claim 6, wherein the processor generates guides for a charge current and a discharge current comprising the charge current limit (CCL) and the discharge current limit (DCL) and transmits the guides to a preregistered terminal through a communication unit.

8. The apparatus for controlling balance of a battery as claimed in claim 6, wherein the processor controls a charge current of the battery corresponding to the charge current limit (CCL) and controls an output of the battery corresponding to the discharge current limit (DCL).

9. A method for controlling balance of a battery, the method comprising:
   monitoring, by a processor, states of multiple battery cells to detect failure of the multiple battery cells based on voltages of the multiple battery cells measured through a sensor;
   setting, by the processor, a defective battery cell as an exclusion cell;
   performing, by the processor, an imbalance determination as to the multiple battery cells excluding the battery cell set as the exclusion cell; and
   performing, by the processor, a balancing operation with respect to the multiple battery cells excluding the battery cell set as the exclusion cell if the multiple battery cells are in an imbalance state,
   wherein performing an imbalance determination includes detecting a battery cell having a lowest voltage among remaining battery cells excluding the battery cell set as the exclusion cell among the multiple battery cells, and performing an imbalance determination with reference to the battery cell having the lowest voltage among the remaining battery cells.

10. The method for controlling balance of a battery as claimed in claim 9, wherein setting a defective battery cell as an exclusion cell includes generating an alarm requesting inspection for the battery cell set as the exclusion cell, followed by outputting the alarm through an output unit.

11. The method for controlling balance of a battery as claimed in claim 9, wherein setting a defective battery cell as an exclusion cell comprises monitoring a voltage of the battery cell set as the exclusion cell.

12. The method for controlling balance of a battery as claimed in claim 10, further comprising:
   releasing, by the processor, after setting the defective battery cell as the exclusion cell, the exclusion setting and the alarm, if inspection for the battery cell set as the exclusion cell is performed or the battery cell set as the exclusion cell is replaced.

13. The method for controlling balance of a battery as claimed in claim 9, wherein, in performing the imbalance determination, if a first battery cell included in the exclusion cell among the multiple battery cells has the lowest voltage, the processor performs the imbalance determination as to the multiple battery cells excluding the first battery cell by comparing a voltage of a second battery cell having the next lowest voltage with a preset value.

14. The method for controlling balance of a battery as claimed in claim 9, wherein performing the balancing operation includes performing the balancing operation for voltage with respect to remaining battery cells excluding the battery cell set as the exclusion cell among the multiple battery cells.

15. The method for controlling balance of a battery as claimed in claim 14, wherein performing the balancing operation comprises performing the balancing operation with respect to the remaining battery cells with reference to a voltage of a battery cell having a lowest voltage among the remaining battery cells.

16. The method for controlling balance of a battery as claimed in claim 9, further comprising:

calculating, by the processor, a state-of-health (SOH) of the multiple battery cells;

calculating, by the processor, a charge current limit (CCL) and a discharge current limit (DCL) of the battery by reflecting the state-of-health (SOH); and generating, by the processor, guides for a charge current and a discharge current comprising the charge current limit (CCL) and the discharge current limit (DCL).

17. The method for controlling balance of a battery as claimed in claim 16, further comprising:

outputting, by the processor, the guides through an output unit or transmitting, by the processor, the guides to a preregistered terminal through a communication unit.

18. The method for controlling balance of a battery as claimed in claim 16, further comprising:

controlling, by the processor, a charge current applied corresponding to the charge current limit (CCL) to charge the battery; and controlling, by the processor, an output of the battery corresponding to the discharge current limit (DCL) to supply the output to a load.

* * * * *